United States Patent [19]

Kawamoto

[11] Patent Number: 4,695,145
[45] Date of Patent: Sep. 22, 1987

[54] MOTOR BUILT-IN LENS MOUNTING

[75] Inventor: Kenichi Kawamoto, Tokyo, Japan

[73] Assignee: Canon Kabushiki Kaisha, Japan

[21] Appl. No.: 825,191

[22] Filed: Feb. 3, 1986

[30] Foreign Application Priority Data

Feb. 7, 1985 [JP] Japan .............................. 60-16216[U]
Dec. 27, 1985 [JP] Japan ........................... 60-204709[U]

[51] Int. Cl.⁴ .............................................. G03B 9/06
[52] U.S. Cl. ................................................. 354/271.1
[58] Field of Search ............................. 350/449, 450; 354/271.1

[56] References Cited

U.S. PATENT DOCUMENTS 4,113,359 9/1978 Kolke et al. ................ 354/271.1 X
4,472,039 9/1984 Iwata et al. ...................... 354/271.1

FOREIGN PATENT DOCUMENTS 56-32823 3/1981 Japan .
56-32824 3/1981 Japan .
57-165825 10/1982 Japan .
57-166847 10/1982 Japan .

Primary Examiner—Donald A. Griffin
Attorney, Agent, or Firm—Toren, McGeady & Associates

[57] ABSTRACT

A lens mounting having a diaphragm unit with a stepping motor as a drive source therefor. A bearing mechanism for the rotor of the motor is constructed with its inner ring in unified form with the rotor unit, and whether or not the diaphragm is at full open aperture is determined by detecting a particular phase of rotation of the rotor.

6 Claims, 5 Drawing Figures

MOTOR BUILT-IN LENS MOUNTING

BACKGROUND OF THE INVENTION

1. Field of the Invention

This invention relates to a lens mounting for film recording camera or magnetic recording medium camera, and, more particularly, to a lens mounting having a built-in motor for driving a diaphragm device therein.

2. Description of the Prior Art

Previous proposals for incorporating a motor within the outer lens barrel so that the diaphragm device or a lens component in the lens mounting is driven by that motor are known in, for example, U.S. Pat. Nos. 4,100,558 and 4,152,060. In order to transmit motion of the motor to the diaphragm device (diaphragm blades), for example, a drive connection between the rotor of the motor and the diaphragm blades can be employed. In this case, however, it is necessary that rotation of the rotor unit be good in stability and quietness. But, the conventional motor built in lens mountings have not ever been improved by paying attention to this point.

Documents concerning the prior-known bearing for the rotor unit may be Japanease Laid-Open Patent Application Nos. SHO 57-165825 and SHO 57-166847, in which the rotor unit and the bearing mechanism are constructed in separate form from each other. To assemble the rotor unit with the bearing mechanism, difficult problems have arisen in the design and in the assembly line, when the number of parts increases and the complexity of structure increases.

Recently, plastic molding techniques have found increased use in making up rotors of plastic magnet, and there have been previous proposals for using these plastic magnets in the motor of the lens mounting as disclosed in U.S. patent application Ser. Nos. 611,413 and 688,365.

It is also known to provide a technique of using a stepping motor for controlling the opening and closing operation of the diaphragm blades, as in Japanese Laid-Open Utility Model Applications Nos. SHO 56-32823 and 56-32824.

SUMMARY OF THE INVENTION

A first object of the invention is to provide a lens mounting of the motor built-in type, in which the diaphragm blades are driven by a rotor of the motor.

In particular, another object, concomitant with the aforesaid first object, is to provide novel bearing means by which the stabilization of rotation of the rotor within the outer lens barrel can be improved.

Another object is to provide a lens mounting of the type described whereby the rotor of the motor is made of synthetic resin material by the molding technique, its magnetized member being constructed in unified form with the inner ring of a ball bearing, and such an assembly of the rotor and the bearing functions not only to drive the diaphragm blades but also to control the angular position of each of the pivotally mounted diaphragm blades.

In case the motor is of the stepping type, the unenergization of the motor allows for free rotation of the rotor. When the lens mounting is swung or given impact, therefore, the rotor is caused to change its angular position. Thereby the diaphragm blades are moved with change in the size of aperture opening.

In the case of a single lens reflex camera or magnetic recording type still video camera, it is customary to set the diaphragm at full open aperture when the brightness of an object to be photographed is measured. For this reason, what must be prepared before the start of light measurement is to detect that the size of aperture opening is at its maximum, and, if not, to move the diaphragm to the full open position.

A second object of the invention is to provide a switch for detecting that the diaphragm has its aperture opening set in the maximum size, whose construction and arrangement is adapted to suit to the rotor unit of the motor built in the lens mounting.

DETAILED DESCRIPTION OF THE PREFERRED EMBODIMENT

Figure 1:
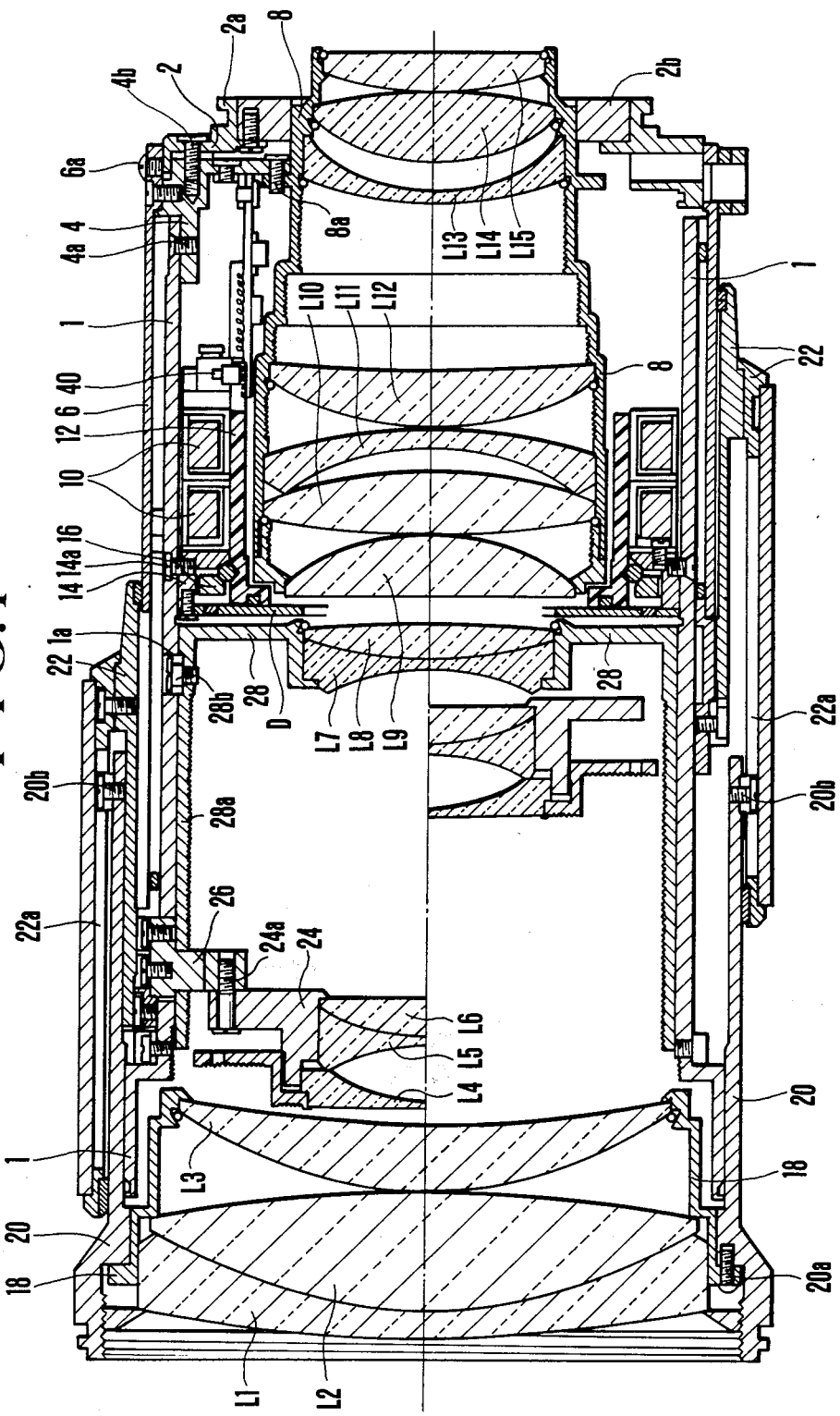
FIG. 1 is a longitudinal sectional view of an embodiment of a lens mounting according to the present invention.

In FIG. 1, a body tube 1 has a mount member 2 at the rear end thereof to be coupled with a mount member on a camera housing (not shown). The mount member 2 has a bayonet ring 2a and fixedly carries a ring-shaped rear wall 2b of the lens mounting. An interconnector between the tube 1 and the member 2 is fixedly secured thereto by screw fasteners 4a and 4b.

An outer barrel 6 is fixedly secured to the mount member 2 by screw fasteners 6a.

A relay lens system L9–L15 is held in a cell 8 fixedly mounted to the interconnector 4 by screw fasteners 8a.

Figure 2:
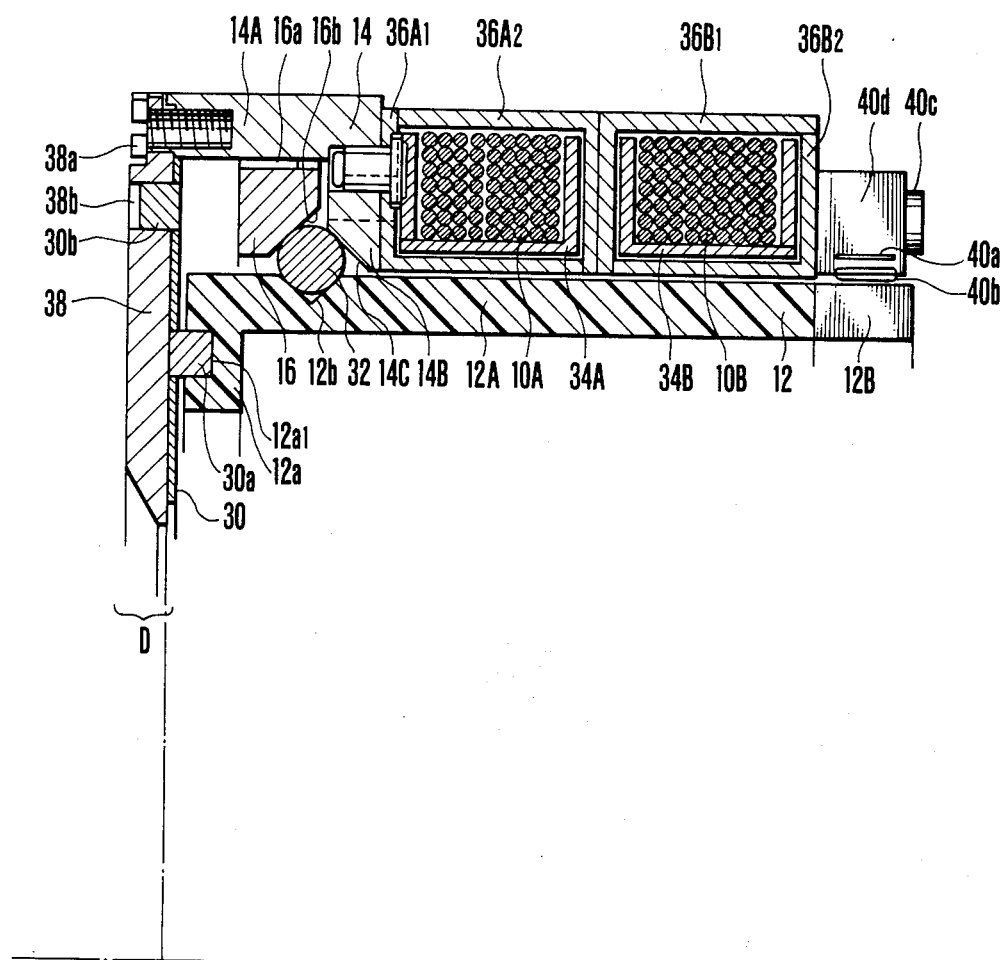
FIG. 2 is a sectional view, in enlarged scale, of the main parts of the diaphragm drive unit of FIG. 1.

A stepping motor has a stator unit 10 and a rotor unit 12 constituting a drive unit for a diaphragm unit D together with bearing members 14 and 16. The details of this diaphragm drive unit are shown in FIG. 2.

A focusing lens group of members L1 to L3 is held in a cell 18 fixedly secured to a movable sleeve 20 by screw fasteners 20a.

An actuator or ring 22 has an longitudinally elongated groove in the inner surface 22a thereof into which a radial pin 20b on the sleeve 20 extends.

A variator lens L4–L6 is held in a cell 24 fixedly secured to a movable member 26 by screw fasteners 24a.

A compensator lens L7, L8 is held in a cell 28 whose tubular portion 28a is movably fitted in the inner diameter of the body tube 1 and has a pin 28b fixedly mounted thereon and extending radially outwardly into a guiding slot 1a formed in the body tube 1.

The aforesaid focusing component L1–L3, zoom component L4–L8, and relay component L9–L15 are operated by the mechanism known in Japanese Laid-Open Patent Application No. SHO 56-54408 (U.S. Pat. No. 4,448,496 issued on May 15, 1984).

Figure 3:
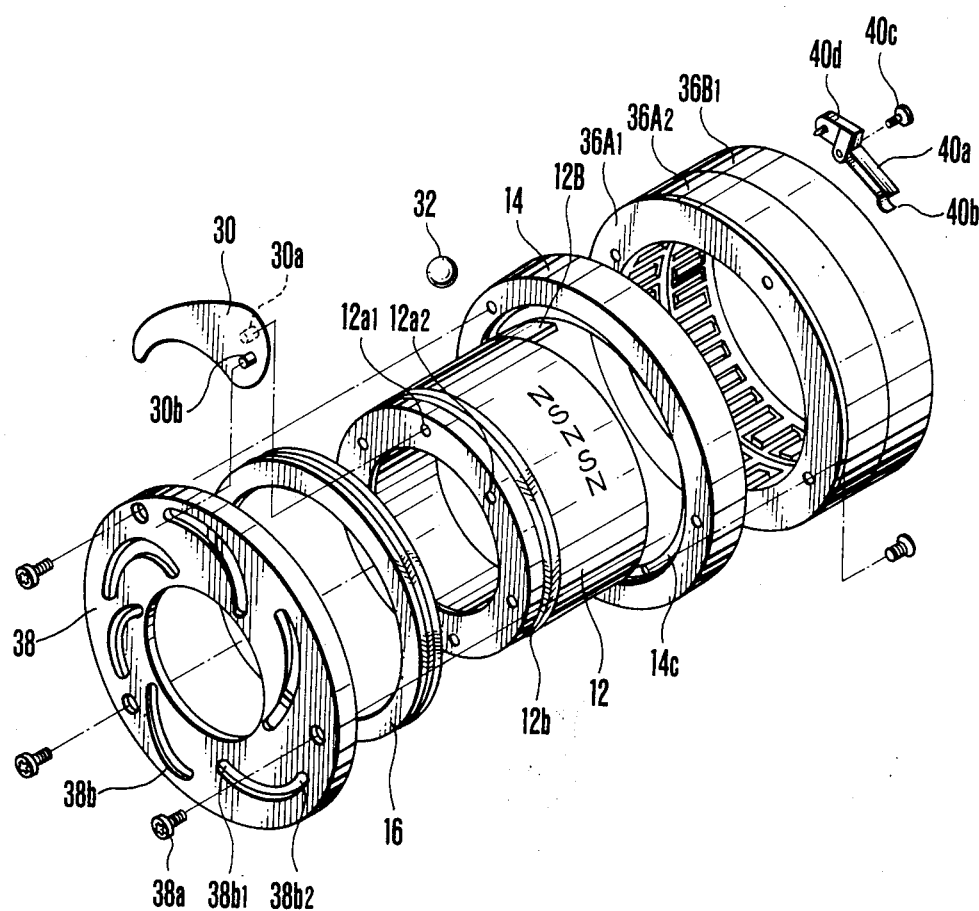
FIG. 3 is an exploded perspective view of the unit of FIG. 2.

FIGS. 2 and 3 illustrate a diaphragm drive unit of the invention. A rotor 12 of the motor is made of a plastic magnet (Mg) obtained by mixing a magnetic substance into synthetic resin material, and is formed to a cylindrical shape for the purpose of facilitating its conformance with the lens cell 8. The area in which the rotor 12 is magnetized is indicated by 12A. The front end of rotor 12 is provided with a flanged portion 12a. Formed in the front face of the flange 12a are a number of round recesses 12a1, 12a2 . . . , 12a6 in equally spaced relation in a common circle, in which respective control pins 30a for the diaphragm blades 30, are movably seated the opposite ends of the pins 30a are fixedly mounted to the rear surfaces of the blades 30. A bearing ball race (or recesses) 12b is (or are) formed in the outer surface of the front end portion of the cylindrical section 12A.

Exciting coils 10A and 10B are contained in respective bobbins 34A and 34B which are surrounded by pairs of yokes having L-shaped cross-sections 36A1, and 36A2, and 36B1 and 36B2, respectively. Each of the yokes has a great number of pole teeth longitudinally elongated in conformance with the circumferential surface of the cylindrical section 12A of the rotor 12 and alternating with those of the opposite yoke in each pair.

An outer member for the bearing balls 32 comprises a first ring 14 having a cylindrical portion 14A and a flange portion 14B radially extending inwardly of the rear end of the cylindrical portion 14A, the inner face of the flange portion 14B being inclined to function as an abutment 14C for the balls 32. The first ring 14 is fixedly secured to the body tube 1 by screw fasteners 14a. A second ring 16 is a retainer ring and has screw-threads in the outer peripheral surface thereof meshing with screw-threads in the inner surface of the cylindrical portion 14A of the first ring 14. The corner between the inner and rear faces of the second ring 16 is cut off to an inclined face 16b for receiving the balls 32.

Thus, the bearing balls 32 are held between the lower pair of opposedly inclined faces of the race 12b of the rotor 12 and the upper pair of opposedly inclined faces 14C and 16b of the first and second rings 14 and 16.

It is to be noted here that the stator unit 10 of the coils 10A and 10B and yokes and the rotor 12 may be exchanged in position with each other.

The diaphragm unit D includes a cam member 38 which is fixedly secured to the front face of the first ring 14 by screw fasteners 38a. This cam member 38 has an equal number, in the instance of FIG. 3, six, of camming slots 38b to the number of the diaphragm blades and is provided with an exposure aperture at the center thereof. Each of the camming slots 38b has one end 38b1 for the minimum size of aperture opening and another end 38b2 for the maximum one. The diaphragm blades 30 are positioned in a space between the cam disc 38 and the flanged portion 12a of the rotor 12. Cam follower pins 30b fixedly mounted on the front surfaces of the respective blades 30 extend into the respective camming slots 38b.

A switch 40, for examining whether or not the diaphragm is at full open aperture, is shown in one form of the invention. For this purpose, many forms of the switch can be considered, such that a movable contact and a fixed contact are comprised of a leaf switch, or that a light emitting element, a photosensitive element and a slit member therebetween are comprised of a light operated switch, or that a magnet-resistance element on the rotor 12 and a detector on the body tube 1 are comprised of a so-called MR switch. In the illustrated embodiment of the invention, use is made of the leaf switch with advantages that it can be installed in any spare space though narrow so that a minimization of the size of the lens mounting is facilitated, and that the reliability of detection is highest.

Fixed and movable contacts 40a and 40b, respectively, are fixedly carried on an electrically non-conductive support 40d fixedly mounted to the yoke 36B2 by a screw fastener 40c. It should be noted that this support 40d may otherwise be mounted to another stationary part of the lens mounting. An actuator for the movable contact 40b is formed to a lobe 12B on the outer surface of the rear end of the rotor 12 and is arranged to lift upward the movable contact 40b until it comes in contact with the fixed contact 40a when the size of aperture opening of the diaphragm blades 30 takes a maximum value, as shown in FIG. 4B. The thus-closed switch 40 produces an output signal which is useful in determining that the diaphragm is set at full open aperture.

Since an exposure value, i.e. shutter time or aperture value, is derived by measuring the brightness of the object with light entering through the photographic lens in the mounting, it is important to ascertain that the diaphragm blades have an aperture opening of the maximum possible size.

With the switch 40 of the invention, when a release button on the camera housing is pushed down, an electrical power supply starts, and an operation of detecting that the switch 40 is closed is initiated. If so, a sequence of light metering—exposure value computing—exposing, and so on operations, begins.

Figure 4A:
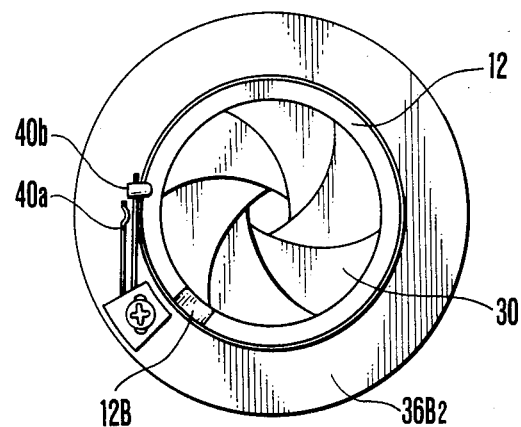
FIGS. 4A and 4B are elevational views of the switch with its actuator in different operative positions.
Figure 4B:
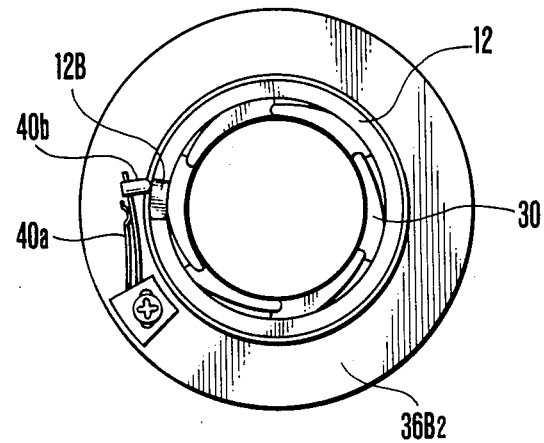

Since the size of the aperture opening defined by the diaphragm blades 30 is controlled in accordance with the phase of rotation of the rotor 12 in cooperation with the cam member 38, for, as the rotor 12 is not set in the initial position, the lobe 12B is moved away from the movable contact 40b as shown in FIG. 4A, the thus-opened switch 40 produces no output signal representing the maximum possible size of aperture opening. Responsive to this, a drive control circuit for the exciting coils 10A and 10B allows current to flow in the reversed direction therethrough, thereby the rotor 12 is brought into the initial position where the switch 40 is closed, after the actuation of a camera release and before the initiation of the light metering operation.

As has been described above, according to the present invention, the magnet rotor is provided with a bearing ball race so that the rotor itself partakes in the bearing structure. This enables the conventional bearing mechanism to be omitted. Another advantage arising from the reduction of the inertia of the rotating part is that it becomes possible to speed up the driving of the diaphragm. Another feature is that the drive connection between the magnet rotor and the diaphragm blades is constructed in the simplest form of respective pins which also serve as pivot pins for the blades. This produces another advantage that the accuracy of diaphragm control becomes higher than when the conventional drive connection having more or less backlash is in use. The durability is also improved. Centering of the magnet rotor and the bearing therefor has been a very difficult operation because the clearance between the yoke and rotor is very narrow. In the invention, however, due to the use of the rotor itself as the inner ring of the ball bearing, after the centering of the rotor has once been established, there is no need to proceed to adjust the center of the bearing to the rotor.

Another adjusting operation for the initial angular position of the rotor relative to the full open aperture position of the diaphragm may be omitted, provided that the angular phase of magnetization of the rotor is in prescribed relation to the angular position of each diaphragm blade about the pivot pin, because the rotor drives the diaphragm directly.

Further, the present invention enables the space between the body tube 1 and the relay lens holder 8, which would otherwise be left not utilized, to accommodate the diaphragm drive unit and the maximum aperture size detector or switch 40 to be placed afar off the diaphragm unit in the rear side of the diaphragm drive unit at the rear surface of the yoke 36B2. This produces an additional advantage in that the diaphragm drive unit and the detector switch can be incorporated in the interior of the outer barrel without involving any increase in the size of the lens mounting, and the structure of construction of the lens mounting becomes simpler than was heretofore possible. That is, in the prior art, as the distance from the diaphragm to the detector switch 40 increases, the size of an actuator for the switch 40 increased. And, the actuator must be arranged to be responsive to rotation of the rotor. Therefore, a problem of how to dispose the switch 40 and actuator 12B rose. According to the present invention, however, the use of synthetic resin material and the molding technique in making up the plastic magnet rotor provides a possibility of forming the inner ring 12b of the ball bearing 32, the magnet array 12A and the actuator 12B as a single unit. Further, the positioning of the switch 40 on the side wall of the yoke 36B2 has a furthermore advantage that the lead wires to the contacts 40a and 40b can be placed without causing their layout to be complicated.

What is claimed is:

1. A diaphragm device comprising:
   (a) a magnet rotor having an aperture through which light passes, said rotor being magnetized about an optical axis;
   (b) an exciting coil and yoke arranged on an outer or inner periphery of said magnetic rotor;
   (c) a diaphragm unit drivenly connected to said magnetic rotor; and
   (d) bearing means for bearing said magnetic rotor, said bearing means including bearing balls, holes or a recess for said balls directly formed in one end portion of an axial length of said magnetic rotor, and a receiving member for receiving said balls, said receiving member being fixedly secured to a stationary member in a lens barrel, said magnetic rotor being supported by said receiving member rotatably around the optical axis by means of said bearing balls.

2. A device according to claim 1, wherein said magnetic rotor is made of plastic material and said hole or said recess is formed in said magnetic rotor.

3. A diaphragm device comprising:
   (a) a body member constituting part of a lens mounting;
   (b) a motor unit positioned inside said body member, said motor unit including a stator unit comprising an exciting coil and a yoke, and a rotor unit arranged inside said stator unit and having an aperture through which light passes and a magnetic member magnetized about an optical axis;
   (c) a diaphragm unit drivenly connected to said rotor unit; and
   (d) means for detecting a maximum aperture of said diaphragm unit by detection of a rotational position of a rotating member of said rotor unit.

4. A device according to claim 3, wherein said detecting means detects the rotating state of said magnetic member in said rotor unit.

5. A diaphragm device comprising:
   (a) a body member constituting part of a lens mounting;
   (b) a motor unit positioned inside said body member, said motor unit including a stator unit comprising an exciting coil and a yoke, and a rotor unit arranged inside said stator unit and having an aperture through which light passes and a magnetic member magnetized about an optical axis;
   (c) a diaphragm unit drivenly connected to said rotor unit; and
   (d) means for detecting that said diaphragm unit is set in a prescribed size of aperture opening arranged to be actuated when said rotor unit rotates to a prescribed position, wherein said magnetic member is formed to a hollow cylindrical shape by plastic molding techniques, and said detecting means includes switch means fixedly secure to said stator unit, whereby said switch means is opened or closed in engagement with an actuator formed in unison with said hollow cylindrical magnetic member.

6. A diaphragm device comprising:
   (a) a magnetic rotor having an aperture through which light passes and being magnetized about an optical axis;
   (b) a stator unit comprising an exciting coil and a yoke, said stator unit arranged on an outer or inner periphery of said magnetic rotor;
   (c) a diaphragm unit drivenly connected to said magnetic rotor, said diaphragm unit being driven directly by said magnetic rotor; and
   (d) a holding member fixed to a fixing member in a lens barrel for rotatably supporting said magnetic rotor, said holding member having a bearing structure for rotatably supporting said magnetic rotor, and said holding member fixedly holding said stator unit and said diaphragm unit so as to integratedly hold said magnetic rotor, said stator unit and said diaphragm unit.

* * * * *